Aug. 31, 1948. W. E. LYNN 2,448,039
VEHICLE-ARRESTING APPARATUS
Filed Sept. 17, 1947

INVENTOR.
W. E. LYNN
BY M. O. Hayes
ATTORNEY

Patented Aug. 31, 1948

2,448,039

UNITED STATES PATENT OFFICE 2,448,039

VEHICLE-ARRESTING APPARATUS

William E. Lynn, Bristol, Pa.

Application September 17, 1947, Serial No. 774,655

14 Claims. (Cl. 244—110)

(Granted under the act of March 3, 1883, as amended April 30, 1928; 370 O. G. 757)

This invention relates to vehicle-arresting apparatus, and more particularly to barriers for restraining the forward motion of an aircraft as it approaches the end of the available area on a landing field of limited extent, such as the flight deck of an aircraft carrier.

An object of the invention is to provide a barrier that is actuated, upon the arrival of an aircraft at greater than a predetermined speed, to impede the progress of the aircraft.

Another object is to provide a barrier that permits the passage of a portion of a vehicle and obstructs the further passage thereof by engaging another portion of the vehicle that is better adapted to absorb the stress of such stoppage.

Another object is to coordinate the operation of a barrier with the movement of a vehicle, without necessarily requiring the use of protruding members or of a source of energy on the vehicle.

Figure 3:
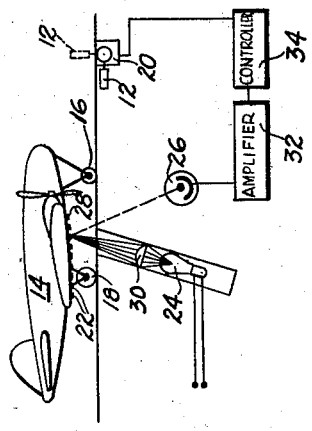
Figure 2:
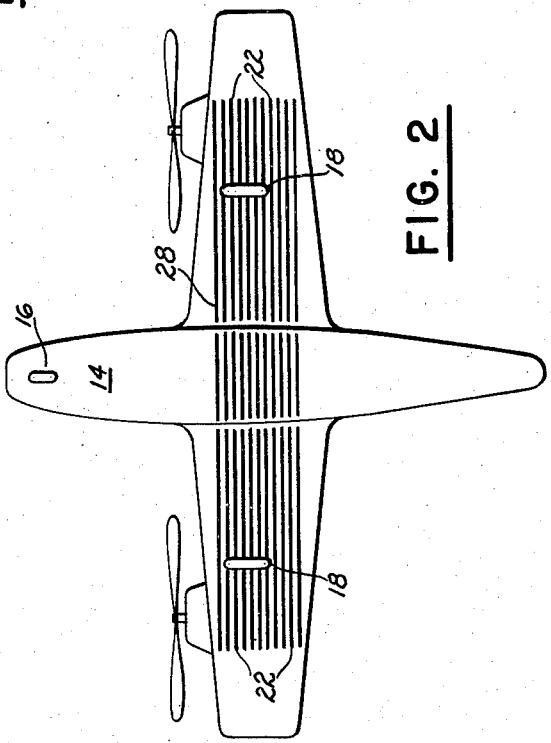
Figure 1:
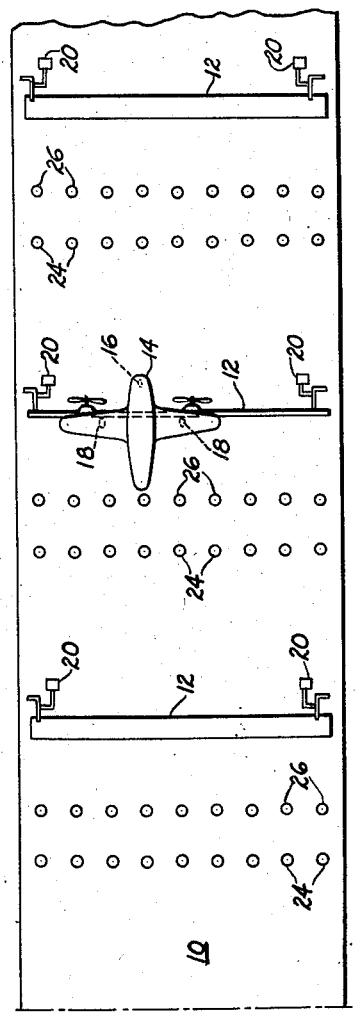

Further objects and advantages of this invention, as well as its construction, arrangement and operation, will be apparent from the following description and claims in connection with the accompanying drawings in which:

Fig. 1 is a plan view of an aircraft carrier flight deck comprising several barriers that embody one form of the invention, Fig. 2 is a view of the under side of an aircraft that is adapted to actuate the barriers and to be retarded thereby, and Fig. 3 is a schematic elevational view of an aircraft rolling on the flight deck of a carrier and initiating the actuation of a barrier according to one embodiment of the invention.

It not infrequently happens, in attempting to land an aircraft on the flight deck of an aircraft carrier, that the aircraft approaches at an excessive rate of speed, the end of the space available for decelerating. Such a circumstance may occur for any of several reasons, among which may be named error in judgment on the part of the pilot, inadequacy or failure of the aircraft's brakes, emergency landing of a large or high-speed aircraft on a smaller carrier than that to which the aircraft is appropriate or unavoidable stowage of other aircraft on a portion of the flight deck that encroaches on the landing area. In such cases, it is important to apply a retarding effect on the aircraft by means of devices incorporated on the carrier, since failure to do so will result in the loss of at least the aircraft concerned, and (in some instances) in damage to or destruction of other aircraft "parked" on the flight deck.

Retarding devices may include taut cables stretched across the flight deck at a short distance above the surface, these being adapted to engage a hook projecting from the aircraft and thereby to exert a retarding effect, and cables or other barriers at a somewhat greater height from the deck adapted to abut the forward surfaces of the aircraft's landing wheels.

Ordinarily a series of the latter type of barrier is installed on the deck of a carrier, and provision is made for quickly retracting each barrier (under the control of an operator) from its effective position to a lower position where substantially no resistance is offered to passage of an aircraft. This is done since it is obviously undesirable indiscriminately to subject every landing aircraft and its personnel to the shock of running into a barrier merely in order to guard against the contingency of occasional vehicles being unable to stop in time without external aid.

It has been considered hazardous, however, to use such barriers to retard aircraft employing tricycle landing gear of the type comprising two main wheels spaced apart on a transverse line that lies slightly behind the aircraft's center of gravity, and a third wheel near the nose of the plane. The third or nose wheel is installed to maintain equilibrium and to facilitate steering, but it is not relied upon to support a major portion of the aircraft's weight, and its attachment to the body of the aircraft may be less sturdy than that of the main wheels. If a conventional barrier were used to halt an aircraft having such a tricycle landing gear, the nose wheel support might collapse upon impact and drop the forward end of the fuselage to the flight deck, whereupon the momentum of the aircraft would tend to make it roll over on its nose, vaulting the main wheels over the barrier and permitting the aircraft to continue beyond the barrier completely out of control.

To forestall such an eventuality, it is necessary to provide a barrier that exerts its restraint only against the main wheels, after having permitted the nose wheel to pass unimpeded. The present invention provides means for doing this, as will be evident from the following description and the annexed drawings in which 10 is an aircraft carrier flight deck comprising a runway or path for aircraft and having a series of barriers 12, and 14 is an aircraft fitted with tricycle landing gear comprising nose wheel 16 and main wheels 18.

Barriers 12 are normally flush or nearly flush with deck 10, but are capable of being quickly propelled by driving mechanism 20 to an elevated position at which they are effective to block progress of main wheels 18 of an aircraft, as shown in the case of the middle barrier 12 in Fig. 1.

As shown in Fig. 2, aircraft 14 is provided on its underside with a plurality of bands or stripes 22 which may be of fluorescent material, these being characterized by the ability to absorb electromagnetic radiation, for example ultraviolet radiation, such as that emitted by lamps 24, and to give off electromagnetic radiation of a frequency that is effective to actuate photoelectric cells 26. Stripes 22 are applied transversely of the aircraft with respect to its direction of flight, and are preferably evenly spaced, beginning at a point such as 28 that is at a predetermined position with respect to main wheels 18.

The installation of photoelectric cells 26 and ultraviolet lamps 24 is arranged so that passage of an aircraft 14 provided with stripes 22 initiates a series of pulses in the electrical circuit associated with photoelectric cell 26. A preferred method of accomplishing this is to provide a lens 30 for concentrating the light from lamp 24 into a region (at about the height of the aircraft undersurface marked with stripes 22) sufficiently small to illuminate only one stripe at a time. Lens 30 may have cylindrical refracting surfaces, so that the illuminated region is virtually a line, paralleling stripes 22; or conventional spherical lenses may be used to restrict illumination to a generally circular area of small radius. The latter is desirable if there is a probability of aircraft proceeding along deck 10 at an inclination to the centerline of the vessel, as might occur if steerable landing wheels were to be employed to permit landing of planes when the aircraft carrier is headed in a direction other than into the wind. Ordinarily, however, it will be found more efficacious to use a planar distribution of light such as would follow from provision of a cylindrical lens at 30, as aforesaid. As an alternative, light from lamp 24 may be distributed more or less at random, and directional sensitivity may be imparted to photoelectric cell 26 by use of a lens system, or baffles, or otherwise.

Amplifier 32 is provided with frequency-sensitive circuits such as filters or counters to alter its response according to the frequency of a received signal from cell 26. The circuits may be such as to ignore any frequency below a predetermined minimum frequency that corresponds to the passage of an aircraft at about the maximum safe speed; i. e., a speed at which the aircraft can still be expected to come to a safe stop in the remaining space relying solely on its brakes. Obviously the said "minimum" frequency at successive barriers should be made progressively less, since the same speed that might be quite safe at one barrier, with one hundred yards of deck length remaining in which to stop, could be intolerably high at another barrier, if the available space thereafter were only twenty-five yards.

For frequencies above the minimum, amplifier 32 actuates controller 34, which in turn releases barrier elevating mechanism 20, powered by a source not shown. The actuation of mechanism 20 may be for example electrical, mechanical, or hydraulic, as considered appropriate to the particular installation. The time interval between the receipt by cell 26 of the first impulse from initial stripe 28 and the actuation of mechanism 20 is gauged to cause barrier 12 to ascend to its blocking position after nose wheel 16 has safely passed over and before main wheels 18 arrive at the barrier. This time interval is decreased if the frequency of signal received by amplifier 32 is increased by the passage of aircraft 14 at greater than the "minimum" speed, so that the greater the aircraft's speed the more quickly elevating mechanism 20 is caused to respond. If mechanism 20 has a sufficiently quick response characteristic, it becomes possible to place lamps 24 and photoelectric cells 26 relatively close to the respective barrier and then to trip the barrier into its restraining position without regard to time delay except insofar as actuation is dependent on speed of the aircraft being above the minimum. However, since the time available between passage of the nose wheel and arrival of the main wheels would be of the order of about one-half to about one-tenth second, depending on the spacing between the wheels and the speed of the aircraft, it is a formidable problem to move a massive barrier into position with sufficient speed to be effective in this way. On the other hand, by allowing sufficient space between photoelectric cells 26 and corresponding barrier 12 to afford one or two seconds of transit time therebetween for an aircraft moving at average speed, the problem of achieving extremely quick response of mechanism 20 is avoided. The additional time thus gained is available for initiating response of mechanism 20, but care should be exercised in design of timing circuits of amplifier 32 and controller 34 to assure that barrier 12 does not attain an elevated position early enough seriously to impede nose wheel 16.

Dependence of control on the frequency of the received signal at cell 26 has the additional advantage of minimizing the probability that barrier 12 will be erected as a result of extraneous light impinging on the cell, for example light that may be emitted by flares, the firing of projectiles, the use of searchlights, etc. In effect, amplifier 32 and controller 34 respond only to a train of pulses of regular occurrence with a pulse-repetition frequency at least that corresponding to the minimum aircraft speed at which it is considered necessary to erect the barrier and to arrest the forward motion of the aircraft.

Other embodiments of the invention for achieving substantially the same result are also possible. For example, a photoelectric cell may be provided as at 26, but in lieu of ultraviolet source 24 and fluorescent stripes 22 there may be two or more sources of illumination incorporated in the underside of aircraft 14 and arranged to project radiation downward to photoelectric cell 26. In that event amplifier 32 and controller 34 may be made responsive to receipt of two or more impulses, depending on the number of lamps used on the aircraft. The timing of mechanism 20 may be coordinated with the speed of the aircraft in a manner analogous to that previously described in connection with the use of fluorescent stripes on the underside of the aircraft. Alternatively, several photoelectric cells 26 may be arranged in a series to be actuated in succession by one or more lamps that project radiation downward from aircraft 14.

Obvious adaptations of the foregoing embodiments will now suggest themselves. For example, one lamp 24 and a series of photoelectric cells 26, or a series of lamps 24 and one photoelectric cell 26 (the series of lamps or cells being distributed along the direction of motion of aircraft 14) may be employed, instead of the single lamp and cell previously described, to irradiate an area on the underside of aircraft 14 provided with a surface having re-radiating characteristics (reflective or fluorescent).

By such means the necessity for special marking patterns on the aircraft may be circumvented, and, in addition, spacing between lamps or cells may be varied over a wide range to achieve the most satisfactory time intervals between pulses for proper performance of amplifier 32 and controller 34.

In operation, an aircraft 14 proceeding along deck 10 enters an area where radiation as from lamps 24 impinges upon the under side of the aircraft. The radiation first causes fluorescence of stripe 28, and light emanating from that stripe actuates photoelectric cell 26 and provides a signal pulse to amplifier 32. Corresponding to the continued passage of aircraft 14 and to the repeated energization of cell 26 from consecutive stripes 22, a train of such pulses is received by amplifier 32 with a pulse repetition rate proportional to the speed of the aircraft. Should such pulse repetition rate be less than a predetermined amount (corresponding to a maximum safe speed) the signals are rejected and no further response takes place. Should the pulse repetition rate, however, be above the predetermined minimum, controller 34 actuates mechanism 20 to raise barrier 12 after a time interval that is approximately inversely proportional to the pulse repetition rate, or directly proportional to the length of time required for the occurrence of a predetermined number of pulses. This time interval is such that barrier 12 assumes a blocking position with respect to main wheels 18 after having permitted passage of nose wheel 16 virtually unimpeded.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In combination, a vehicle adapted to give off electromagnetic radiation, means providing a path for said vehicle, means movable into a position blocking said path, means responsive to said radiation and adapted for moving said movable means into said position.

2. In combination, a source of electromagnetic radiation, a vehicle adapted to receive said radiation and adapted, upon the reception of such radiation, to give off electromagnetic radiation, means providing a path for said vehicle, means movable into a position blocking said path, and means responsive to said given-off radiation and adapted for moving said movable means into said position.

3. In combination, a vehicle adapted to give off electromagnetic radiation, means providing a path for said vehicle, means responsive to said radiation when said vehicle is moving over an area of said path, an element movable into a position beneath said vehicle and means activated by said responsive means and adapted to move said element into said position while said moving vehicle is still in part over said area.

4. The combination set forth in claim 3 characterized by said vehicle having parts adapted to touch said path and said position being between said parts.

5. In combination a movable object adapted to give off electromagnetic radiation at the beginning and end of a time interval, a second object relatively fixed and adapted to receive said radiations, an element, and means, activated by said received radiations, for moving said element after a period of time after said interval, said period of time depending upon the length of said interval.

6. The combination set forth in claim 5 characterized by said second object being adapted to excite said first object to give off said radiation.

7. The combination set forth in claim 5 characterized by the motion of said element being into the path of the movable object.

8. In combination a relatively movable object, a relatively fixed object, a first set comprising at least two electromagnetic elements, a second set comprising at least one electromagnetic element, on of said sets being movable with said movable object the other of said sets being relatively fixed, said movable set being adapted to give off electromagnetic radiation at the beginning and end of a time interval, said fixed set being adapted to be excited by the first-mentioned radiation, an element, and means activated by said fixed set for moving said element after a period of time after said interval, said period depending upon the length of said interval.

9. The combination set forth in claim 8 characterized by an ultraviolet light source on said fixed body, said radiation being a fluorescence set up by ultraviolet light from said source, said fixed set being photosensitive, and said activated means including an electric circuit.

10. In combination an aircraft having forward and rear landing elements and having a plurality of transverse stripes of fluorescent material, a landing runway having a source of ultraviolet light thereon directed upward and having a photosensitive cell adapted to receive fluorescence successively from said stripes, a barrier adapted to be moved into a position beneath said aircraft and between said elements, and an electric circuit adapted to be activated by said cell and to move said barrier to said position at a time depending upon the rapidity with which said cell receives the successive amounts of fluorescence from the successive stripes.

11. In combination, an object movable in a predetermined direction, a plurality of areas movable with said object and spaced along a line having a component in said direction and adapted to give off electromagnetic radiation, a second object, past which said first object is movable and having an area adapted to undergo receptions successively of said radiation from successive ones of said areas as they successively pass a point, and means responsive to the time interval between said receptions and adapted to move an element at a predetermined distance from said area as measured along said direction and at a predetermined time after said receptions.

12. In combination, an object movable in a predetermined direction, a plurality of areas movable with said object and spaced along a line having a component in said direction and adapted to give off electromagnetic radiation, a second object, past which said first object is movable and having an area adapted to undergo receptions successively of said radiation from successive ones of said areas as they successively pass a point, a movable element, motivating means for moving said element, and electric means responsive to the time interval between said receptions and adapted for activating said motivating means, said electric means and said motivating means being adapted to operate at a predetermined combined rate of speed, whereby said element may be moved to a predetermined point at a predetermined time after said area undergoes the first of said receptions.

13. In combination an object movable in a predetermined direction, a plurality of areas movable with said object and spaced along a line having a component in said direction and adapted to give off electromagnetic radiation, a second object, past which said first object is movable and having an area adapted to undergo receptions successively of said radiation from successive ones of said areas as they successively pass a point, electric means having respectively different responses to respectively different frequencies of said receptions, and motivating means respectively differently activated by said responses, and a movable element movable by said motivating means.

14. In combination an object movable in a predetermined direction, a plurality of areas movable with said object and spaced along a line having a component in said direction and adapted to give off electromagnetic radiation, a second object, past which said first object is movable and having an area adapted to undergo receptions successively of said radiation from successive ones of said areas as they successively pass a point, electric means having one response to one time period between said receptions and having a different response to a longer time period between said receptions, a movable element, and means for causing said element to move and activatable by said one response and only after an interval and activatable only after a longer interval by said different response whereby said element is moved only some time after the first object has passed said point, the length of the last-mentioned time depending upon the speed of the first object past said point.

WILLIAM E. LYNN.